(12) United States Patent
Dong

(10) Patent No.: US 12,189,962 B2
(45) Date of Patent: Jan. 7, 2025

(54) BUFFER THRESHOLD MONITORING TO REDUCE DATA LOSS

(71) Applicant: Micron Technology, Inc., Boise, ID (US)

(72) Inventor: Qi Dong, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 149 days.

(21) Appl. No.: 17/967,339

(22) Filed: Oct. 17, 2022

(65) Prior Publication Data

US 2024/0126449 A1    Apr. 18, 2024

(51) Int. Cl.
*G06F 3/06* (2006.01)

(52) U.S. Cl.
CPC .......... *G06F 3/0619* (2013.01); *G06F 3/0634* (2013.01); *G06F 3/0656* (2013.01); *G06F 3/0673* (2013.01)

(58) Field of Classification Search
CPC .... G06F 3/0619; G06F 3/0634; G06F 3/0656; G06F 3/0673; G06F 3/061; G06F 3/0679
See application file for complete search history.

(56) References Cited

U.S. PATENT DOCUMENTS

| | | | | |
|---|---|---|---|---|
| 2006/0221697 A1* | 10/2006 | Li | .................... | G11C 16/3468 365/185.18 |
| 2008/0209103 A1* | 8/2008 | Haga | .................. | G11B 5/40 711/E12.001 |
| 2011/0274048 A1* | 11/2011 | Denteneer | .............. | H04L 47/60 370/328 |
| 2016/0127249 A1* | 5/2016 | Itoh | ........................ | H04L 49/901 370/235 |
| 2019/0132426 A1* | 5/2019 | Kitamura | ................ | H04L 43/16 |
| 2019/0235785 A1* | 8/2019 | Akers | .................... | G06F 3/0659 |
| 2019/0265774 A1* | 8/2019 | Tsien | ..................... | G06F 1/3287 |
| 2019/0280991 A1* | 9/2019 | Singh | ................. | H04L 47/6215 |
| 2022/0210521 A1 | 6/2022 | Peter et al. | | |
| 2022/0261170 A1 | 8/2022 | Vohra et al. | | |
| 2022/0261286 A1 | 8/2022 | Wang et al. | | |
| 2022/0300413 A1 | 9/2022 | Kannan et al. | | |
| 2023/0229347 A1* | 7/2023 | Zilberstein | ............. | G06F 3/068 711/154 |
| 2024/0087077 A1* | 3/2024 | Ray | .......................... | G06T 1/60 |

* cited by examiner

*Primary Examiner* — Hiep T Nguyen

(74) *Attorney, Agent, or Firm* — Brooks, Cameron & Huebsch, PLLC

(57) ABSTRACT

Apparatuses, systems, and methods for buffer threshold monitoring to reduce data loss are provided herein. In a number of embodiments of the present disclosure, a method can include buffering data in a first memory device, writing the buffered data from the first memory device to a second memory device, determining that the first memory device is storing at least a threshold amount of data, and sending a first signal to the second memory device in response to determining that the first memory device is storing at least the threshold amount of data, wherein the first signal causes the second memory device to enter an increased write performance mode.

19 Claims, 4 Drawing Sheets

BUFFER THRESHOLD MONITORING TO REDUCE DATA LOSS

TECHNICAL FIELD

The present disclosure relates generally to memory devices, and more particularly, to apparatuses, methods, and systems for buffer threshold monitoring to reduce data loss.

BACKGROUND

Memory devices are typically provided as internal, semiconductor, integrated circuits in computers or other electronic devices. There are many different types of memory including volatile and non-volatile memory. Volatile memory can require power to maintain its data and includes random-access memory (RAM), dynamic random access memory (DRAM), and synchronous dynamic random access memory (SDRAM), among others. Non-volatile memory can provide persistent data by retaining stored data when not powered and can include NAND flash memory, NOR flash memory, read only memory (ROM), Electrically Erasable Programmable ROM (EEPROM), Erasable Programmable ROM (EPROM), and resistance variable memory such as phase change random access memory (PCRAM), resistive random access memory (RRAM), and magnetoresistive random access memory (MRAM), among others. A memory device can be included on a printed circuit board assembly (PCBA).

DETAILED DESCRIPTION

Figure 1:
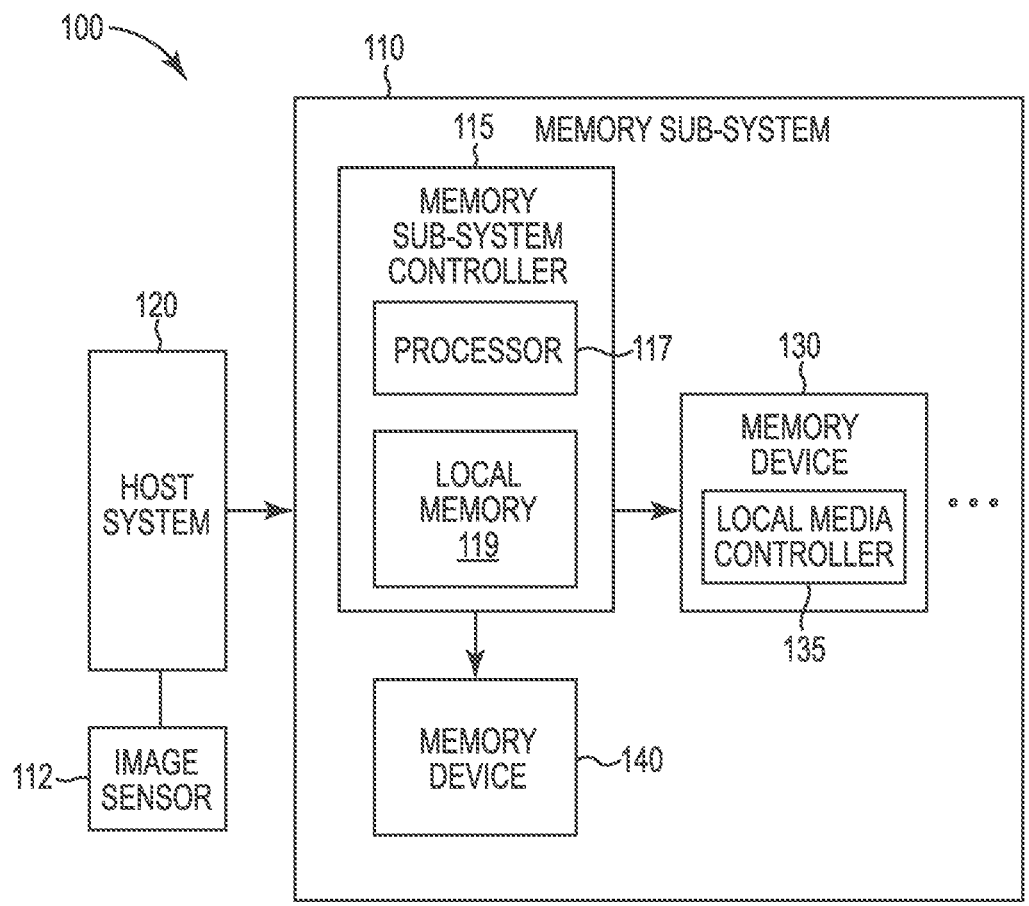
FIG. 1 illustrates an example computing system that includes a memory sub-system in accordance with some embodiments of the present disclosure.

Apparatuses, systems, and methods for buffer threshold monitoring to reduce data loss are provided herein. In a number of embodiments of the present disclosure, a method can include buffering data in a first memory device, writing the buffered data from the first memory device to a second memory device, determining that the first memory device is storing at least a threshold amount of data, and sending a first signal to the second memory device in response to determining that the first memory device is storing at least the threshold amount of data, wherein the first signal causes the second memory device to enter an increased write performance mode.

A memory system can store data (e.g., video data) captured by an image sensor. The memory system can receive the data, store the data in a buffer, and transfer the data from the buffer to a memory device. If the buffer is receiving data at a rate that is greater than a rate that the data is transferred from the buffer and written to the memory device, data loss can occur. Data loss can be caused by latency in writing the data in the memory device. In an example where the data is video data, data loss can result in frame drop where frames of video are missing from the video data stored in the memory device.

In the following detailed description of the present disclosure, reference is made to the accompanying drawings that form a part hereof, and in which is shown by way of illustration how a number of embodiments of the disclosure may be practiced. These embodiments are described in sufficient detail to enable those of ordinary skill in the art to practice the embodiments of this disclosure, and it is to be understood that other embodiments may be utilized and that process, electrical, and/or structural changes may be made without departing from the scope of the present disclosure.

As used herein, "a number of" something can refer to one or more of such things. For example, a number of dampers can refer to one or more dampers. Additionally, designators such as "V", "W", "X", "Y", and "Z", as used herein, particularly with respect to reference numerals in the drawings, indicates that a number of the particular feature so designated can be included with a number of embodiments of the present disclosure.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, the proportion and the relative scale of the elements provided in the figures are intended to illustrate various embodiments of the present disclosure and are not to be used in a limiting sense.

FIG. 1 illustrates an example computing system 100 that includes a memory sub-system 110 in accordance with some embodiments of the present disclosure. Aspects of the present disclosure are directed to memory sub-system 110 monitoring buffer levels to reduce data loss, in particular to memory sub-systems 110 that include a storage device, a memory module, or a combination of such. An example of a memory sub-system 110 is a storage system such as a solid-state drive (SSD). Examples of storage devices and memory modules are described below in conjunction with FIG. 1.

In general, a host system (e.g., host) 120 can utilize a memory sub-system 110 that includes one or more components, such as memory devices 130 that store data. The host system 120 can provide data to be stored at the memory sub-system 110 and can request data to be retrieved from the memory sub-system 110.

A memory device 130 can be a non-volatile memory device. One example of non-volatile memory device is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be grouped into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device 130 used to store data and can include a group of memory cells, a word line group, a word line, or individual memory cells. For some memory devices 130, blocks (also hereinafter referred to as "memory blocks") are the smallest area that can be erased. Pages cannot be erased individually, and only whole blocks can be erased.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Each of the memory devices 140, 130 can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The computing system 100 can include an image sensor 112 coupled to host system 120. The image sensor 112 can also be located on host system 120. Image sensor 112 can generate data (e.g., video data and/or image data) for storage on the memory system 110. The host system 120 can process the data (e.g., compress the data) generated by image sensor 120 and the host system can send the data generated by image sensor 120 to memory system 110 for storage. The host system 120 can include a processor, such as a graphics processing unit (GPU), for processing the data generated by image sensor.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface.

The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via the same communication connection, multiple separate communication connections, and/or a combination of communication connections.

The memory devices 140, 130 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 140, 130 to perform operations such as reading data, writing data, or erasing data at the memory devices 140, 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 140, 130. The memory sub-system controller 115 can further include host interface circuitry to communicate with the host system 120 via the physical host interface. The host interface circuitry can convert the commands received from the host system 120 into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory device 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local memory controller 135) for media management within the same memory device package. An example of a managed memory device is a managed NAND (MNAND) device.

Figure 2:
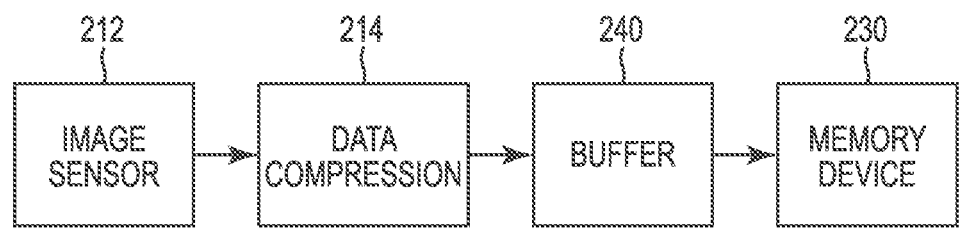
FIG. 2 is a block diagram of a computing system configured to capture and store video data in accordance with a number of embodiments of the present disclosure.

FIG. 2 is a block diagram of a computing system configured to capture and store video data in accordance with a number of embodiments of the present disclosure. Image sensor 212 can generate image data in form of photographs or video data. Image sensor 212 can compress the data 214 or send the image data to a processor, such as a GPU, for data compression 214. The data can then be sent to a memory system for storage. The memory system can include a buffer 240 to temporarily store the data before storing the data on memory device 230. The buffer 240 can include volatile memory to temporarily store the data to reduce data loss due to a difference in the rate that the image sensor is generating data and sending data to the memory system and the rate at which the memory device 230 is writing the data.

In response to buffer 240 being at a threshold level (e.g., storing at least a threshold amount of data), memory device 230 can be transitioned to an increased write performance mode. The increase write performance mode can increase the rate at which memory device 230 is writing data from buffer 240 to memory device 240, which can decrease the level of data in buffer 240. The increase write performance mode can cause the level of data in buffer 240 to drop below the threshold level. In response to buffer 240 dropping below the threshold level of data, memory device can exit the increased write performance mode. The increased write performance mode can include discontinuing performance of background operations, using single programming pass write operations, and/or storing data in single level cell (SLC) mode. Exiting the increased write performance mode can include resuming performance of background operations, using multiple programming pass write operations, and/or storing data in multi-level cell (MLC) mode.

Figure 3:
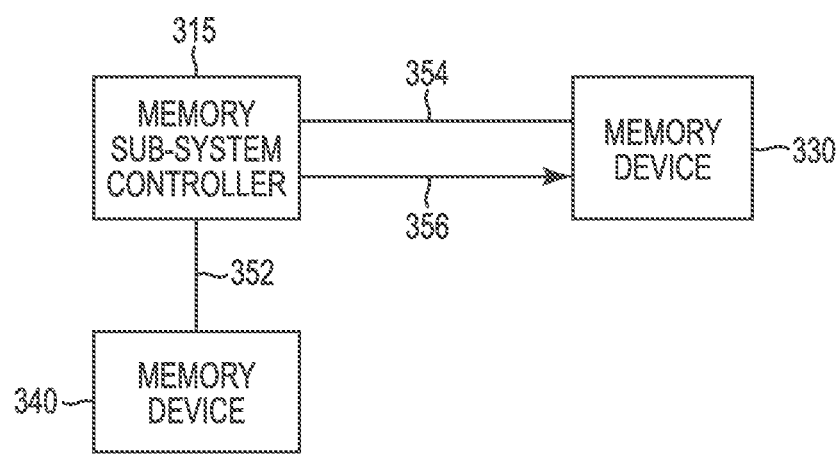
FIG. 3 is a block diagram of a memory-sub system configured to buffer and store video data in accordance with a number of embodiments of the present disclosure.

FIG. 3 is a block diagram of a memory-sub system configured to buffer and store video data in accordance with a number of embodiments of the present disclosure. The memory sub-system controller 315 can be configured to receive data from an image sensor and/or host system and buffer the data on memory device 340. The data can be transferred between the memory sub-system controller 315 and memory device 340 on data bus 352. The memory sub-system controller 315 can be configured to store the data on memory device 330. To store the data on memory device 330, the data buffered on memory device 340 can be transferred to the memory sub-system controller 315 on data bus 352 and from the memory sub-system controller 315 to memory device 330 on data bus 354. Data can be transferred between the memory sub-system controller 315 and memory device 330 on data bus 354.

The memory sub-system controller 315 can be configured to monitory the amount of data that buffered in memory device 340. If the amount of data buffered in memory device 340 is at least a threshold amount, the memory sub-system controller 315 can send a first signal to memory device 330 on signal bus 356. The first signal can cause memory device 330 to enter an increased write performance mode. If the amount of data buffered in memory device 340 is reduced and drops below a threshold amount, the memory sub-system controller 315 can send a second signal to memory device 330 on signal bus 356. The second signal can cause memory device 330 to exit an increased write performance mode.

Figure 4:
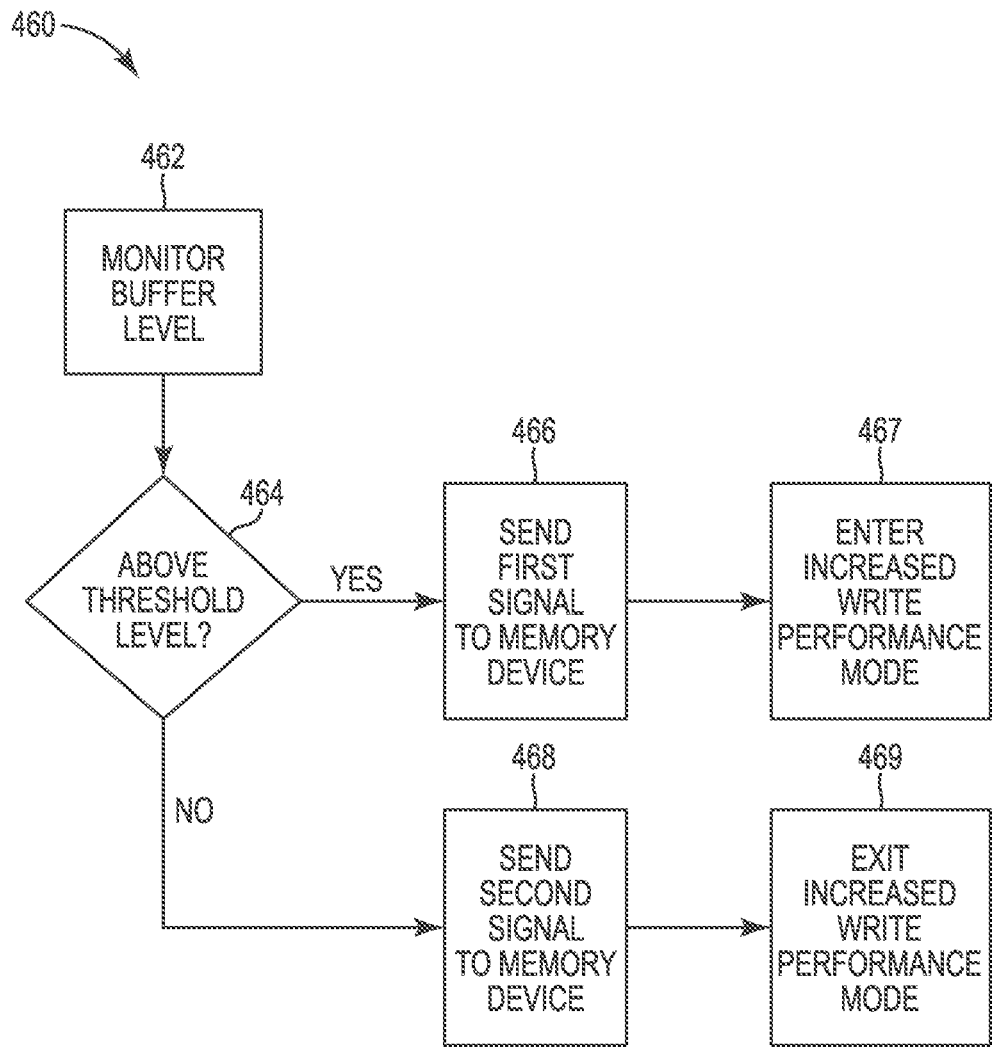
FIG. 4 is a flow diagram of a method for determining write performance based on a buffer threshold in accordance with a number of embodiments of the present disclosure.

FIG. 4 is a flow diagram of a method for determining write performance based on a buffer threshold in accordance with a number of embodiments of the present disclosure. The method 460 in FIG. 4 can include monitoring the buffer level 462.

The method can include determining the amount of data is above or below a threshold level 464. Frame drop can occur when the memory system is storing video data and the buffer is receiving data at rate that is greater than a rate at which the memory device is writing the data received from the buffer. If amount of data in the buffer is above a threshold amount, a first signal is sent to the memory device storing the data 466. The first signal causes the memory device to enter an increased write performance mode 467. The increased write performance mode can cause the memory device to write data received from the buffer at a rate that is greater than the rate which the memory sub-system is receiving data and buffering the data in the buffer. Thus the increased write performance mode can cause the amount of data in the buffer to be reduced. If the amount of data drop below the threshold amount of data, a second signal can be sent to the memory device storing the data 468. The second signal can cause the memory device storing the data to exit the increase write performance mode 469.

Figure 5:
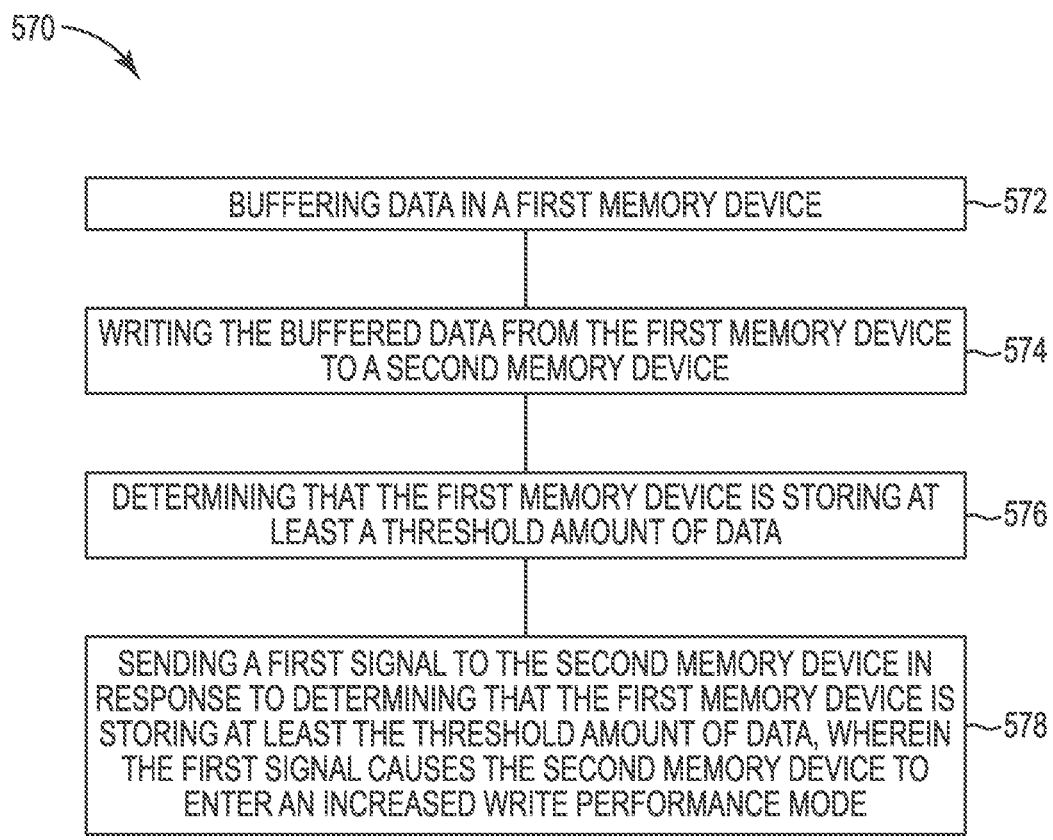
FIG. 5 is a flow diagram of a method for buffer threshold monitoring in accordance with a number of embodiments of the present disclosure.

FIG. 5 is a flow diagram of a method for buffer threshold monitoring in accordance with a number of embodiments of the present disclosure. At 572, the method 570 can include buffering data in a first memory device.

At 574, the method 570 can include writing the buffered data from the first memory device to a second memory device. The memory system can receive data (e.g., image and/or video data) from a host and/or image sensor. The memory system can be configured to buffer the data in a first memory device, such as a DRAM memory device.

At 576, the method 570 can include determining that the first memory device is storing at least a threshold amount of data. Data is transferred from the buffer to another memory device for storage on the another memory device. If the buffer is filled before the data can be transferred from the buffer to the another memory device, data loss can occur. In the example where the data is video data, the data loss can result in frame drop in the video.

At 578, the method 570 can include sending a first signal to the second memory device in response to determining that the first memory device is storing at least the threshold amount of data, wherein the first signal causes the second memory device to enter an increased write performance mode.

The increased write performance mode can include discontinuing performance of background operations, using single programming pass write operations, and/or storing data in single level cell (SLC) mode. The increase write performance mode can increase the rate at which memory device 230 is writing data from buffer 240 to memory device 240, which can decrease the level of data in buffer 240. The increase write performance mode can cause the level of data in buffer 240 to drop below the threshold level.

In response to buffer 240 dropping below the threshold level of data, memory device can exit the increased write performance mode. Exiting the increased write performance mode can include resuming performance of background operations, using multiple programming pass write operations, and/or storing data in multi-level cell (MLC) mode.

Although specific embodiments have been illustrated and described herein, those of ordinary skill in the art will appreciate that an arrangement calculated to achieve the same results can be substituted for the specific embodiments shown. This disclosure is intended to cover adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
a first memory device;
a second memory device; and
a controller, coupled to the first memory device and the second memory device, configured to:
buffer data in the second memory device;
write the buffered data from the second memory device to the first memory device;
send a first signal to the first memory device in response a determination that the second memory device is storing at least a threshold amount of data, wherein the first signal causes the first memory to enter an increased write performance mode; and
continue to write the buffered data from the second memory device to the first memory device in response to entering the increased write performance mode, wherein the increased write performance mode increases the rate at which the buffered data is written to the first memory device.

2. The apparatus of claim 1, wherein the increased write performance mode discontinues performance of background operations.

3. The apparatus of claim 1, wherein the increased write performance mode uses single programming pass write operations.

4. The apparatus of claim 1, wherein the controller is configured to determine the second memory device is storing less than the threshold amount of data in response to the first memory device operating in the increased write performance mode.

5. The apparatus of claim 4, wherein the controller is configured to send a second signal to the first memory device in response to the determination that the second memory device is storing less than the threshold amount of data and wherein the second signal causes the first memory device to exit the increased write performance mode.

6. The apparatus of claim 5, wherein the first memory device resumes performing background operations in response to receiving the second signal.

7. The apparatus of claim 1, wherein the second memory device is a buffer for the first memory device and the second memory device is receiving and storing video data from a camera coupled to the apparatus.

8. A method, comprising:
buffering data in a first memory device;
writing the buffered data from the first memory device to a second memory device;
determining that the first memory device is storing at least a threshold amount of data;
sending a first signal to the second memory device in response to determining that the first memory device is storing at least the threshold amount of data, wherein the first signal causes the second memory device to enter an increased write performance mode; and
continuing to write the buffered data from the first memory device to the second memory device in response to entering the increased write performance mode, wherein the increased write performance mode increases the rate at which the buffered data is written to the second memory device.

9. The method of claim 8, further comprising discontinuing performance of background operations in response to entering the increase write performance mode.

10. The method of claim 8, further comprising performing single programming pass write operations in response to entering the increase write performance mode.

11. The method of claim 8, further comprising determining the first memory device is storing less than the threshold amount of data in response to the second memory device operating in the increased write performance mode.

12. The method of claim 11, further comprising sending a second signal to the second memory device in response to the determination that the first memory device is storing less than the threshold amount of data, wherein the second signal causes the second memory device to exit the increased write performance mode.

13. The method of claim 8, further comprising changing the threshold amount of data based on a rate that the first memory device is receiving data.

14. The method of claim 8, further comprising changing the threshold amount of data based on a rate that second memory device is writing data.

15. An apparatus, comprising:
a first memory device;
a second memory device; and
a controller, coupled to the first memory device and the second memory device, configured to:
receive data from a camera coupled to the apparatus;
store the data in the first memory device, wherein the first memory device is a buffer;
transfer the data in the first memory device to the second memory device and store the data in the second memory device;
set a threshold amount of data for the first memory device to store; and
send a first signal to the second memory device in response to the first memory device storing the threshold amount of data, wherein the second memory device enters an increased write performance mode in response to receiving the first signal; and
continue to transfer the data in the first memory device to the second memory device and store the data in the second memory device in response to entering the increased write performance mode, wherein the increased write performance mode increases the rate at which the data is transferred to and stored in the second memory device.

16. The apparatus of claim 15, wherein the second memory device discontinues performance of background operations in the increased write performance mode.

17. The apparatus of claim 15, wherein the second memory device performs single programming pass write operations in the increased write performance mode.

18. The apparatus of claim 15, wherein controller is configured to send a second signal to the second memory device in response to second memory device operating in the increased write performance mode and determining the first memory device is storing less than the threshold amount of data.

19. The apparatus of claim 15, wherein frame drop of the video data occurs in the second memory device when the first memory device stores more than the threshold amount of data.

* * * * *